Patented Oct. 11, 1949

2,484,046

UNITED STATES PATENT OFFICE 2,484,046

METHOD OF TREATING SCALE FORMING LIQUORS

Carl Helmer Nyman, Stockholm, Sweden

No Drawing. Original application November 22, 1940, Serial No. 366,724. Divided and this application March 2, 1943, Serial No. 477,761. In Sweden February 1, 1940

1 Claim. (Cl. 260—124)

This invention relates to the treatment of liquors with a tendency for undesirable scale formation during a subsequent heat exchange process and has for an object to modify the composition of the scale so as to become more readily removable by relatively inexpensive solvents, being particularly recommended for accomplishment in the case of liquor used in the digestion stage of cellulose manufacture when such liquor is to be subjected to relatively high temperature treatment in apparatus of the indirect heat exchange type.

Other objects and advantages of the invention will be apparent from the following detailed description of some preferred embodiments thereof.

This application is a division of my copending application Ser. No. 366,724 filed Nov. 22, 1940, now abandoned.

In accordance with the invention the desired object is attained by establishing in the liquor a finely dispersed suspension of a solid substance with such properties that it remains physically and chemically unchanged in the liquor but can be brought into solution by a suitable solvent more readily than the scale forming components of the liquor, and allowing said substance to deposit together with said scale forming components.

Thus, there will be obtained a scale which contains a relatively high proportion of readily soluble substance and this substance is rapidly brought into solution by the solvent in question so that the scale is largely disintegrated and then also the particles of less soluble components will more effectively be subjected to dissolving action or partly released from the mixture and removed.

Such suspension can be prepared by adding a suitable substance to the liquor or by treating the liquors with suitable chemicals capable of reacting with some component of the liquor so as to form a precipitating compound with the desired properties.

More specifically, as in the case of sulphite waste liquor there may be used for this purpose a neutralizing reagent capable of reacting with the calcium ions of the liquor so as to form a precipitating compound with such properties that it can readily be brought into solution by relatively weak acid solutions, and it is preferred to provide the neutralizing reagent in the form of the salt of a weak acid.

Sulphite waste liquor, for instance, may with advantage be treated with sodium carbonate as a neutralizing reagent to precipitate calcium sulphite which is not a very objectionable scale forming substance since it is readily dissolved by sulphurous acid and other diluted mineral acids. Thus, there is established a suspension of calcium sulphite in the liquor and during the subsequent heat exchange process this calcium sulphite is allowed to deposit together with such part of the calcium sulphate content of the liquor as may precipitate and will be embedded in the scale crust together with the calcium sulphate. Thereby the composition and character of the scale crust formed is changed so that it can be more readily removed by weak acid solutions, and this is a very convenient and relatively inexpensive way to clean the heat exchange surfaces. Other neutralizing reagents which can be used in this case, are alkali hydroxides and alkali acetates, for instance.

In the treatment of sulphite waste liquor with a neutralizing agent as described it is mostly advisable to use such agent in an amount to adjust the pH-value of the liquor to 6–6, 5, in order to obtain a sufficient quantity of precipitate and establish conditions which reduce the tendency of the calcium sulphate to precipitate.

Obviously it is possible to vary the treatment in many other ways without departing from the scope of the invention and it is expressly understood that the invention is not to be limited otherwise than by the appended claim.

What is claimed is:

The method of treating liquors with a tendency for undesirable scale formation during subsequent heating to modify the composition of the scale so as to become more readily removable by relatively inexpensive solvents, which comprises establishing in the liquor a finely dispersed suspension of calcium sulphite, passing the liquor containing said suspension to the apparatus for heating, and allowing said substance to deposit together with said scale forming components in order to obtain a scale which will thereby be removable by weak acid solutions.

CARL HELMER NYMAN.

REFERENCES CITED

The following references are of record in the file of this patent:

UNITED STATES PATENTS

| Number | Name | Date |
|---|---|---|
| 1,059,716 | Dickerson | Apr. 22, 1913 |
| 1,130,192 | Oman | Mar. 2, 1915 |
| 1,441,243 | Romer | Jan. 9, 1923 |
| 2,059,570 | Fiske et al. | Nov. 3, 1937 |
| 2,140,992 | Gensecke | Dec. 20, 1938 |

FOREIGN PATENTS

| Number | Country | Date |
|---|---|---|
| 269,909 | Great Britain | July 19, 1928 |
| 632,403 | Germany | July 7, 1936 |